US005452586A

United States Patent [19]

Hamid

[11] Patent Number: 5,452,586

[45] Date of Patent: Sep. 26, 1995

[54] METHOD FOR FLUSHING A REFRIGERATION SYSTEM

[75] Inventor: Sibtain Hamid, Somerville, N.J.

[73] Assignee: Hüls America, Inc., Piscataway, N.J.

[21] Appl. No.: 308,375

[22] Filed: Sep. 19, 1994

[51] Int. Cl.$^6$ ........ C02F 5/02; F25B 43/02

[52] U.S. Cl. ........ 62/84; 252/68; 62/114

[58] Field of Search ........ 252/68, 56 R, 252/56 S; 62/114, 84

[56] References Cited

U.S. PATENT DOCUMENTS

| | | | |
|---|---|---|---|
| 4,755,316 | 7/1988 | Magid et al. | 252/68 |
| 4,948,525 | 8/1990 | Sasaki et al. | 252/52 A |
| 5,021,179 | 6/1991 | Zehler et al. | 252/54.6 |
| 5,076,064 | 12/1991 | Kopko | 62/114 |
| 5,168,720 | 12/1992 | Keltner | 62/292 |
| 5,174,906 | 12/1992 | Henry | 210/765 |
| 5,220,810 | 6/1993 | Keltner | 62/292 |
| 5,254,280 | 10/1993 | Thomas et al. | 252/68 |
| 5,342,533 | 8/1994 | Kondo et al. | 252/68 |
| 5,372,737 | 12/1994 | Spavschus | 252/68 |
| 5,391,311 | 2/1995 | Ishida et al. | 252/52 A |
| 5,391,313 | 2/1995 | Antika et al. | 252/68 |
| 5,395,544 | 3/1995 | Hagihara et al. | 252/68 |

OTHER PUBLICATIONS

Elf Atochem, "Forane® Retrofit Training Guide" (Date Unknown).

Carpenter, N. E., "Retrofitting HFC134a Into Existing CFC12 Systems," *Int. J. Refrig.*, 1992, vol. 15, No. 6, pp. 332–339. (1992). (month unavailable).

"Retrofit Raises Efficiency, Ups Production," *Oil & Gas Journal*, Feb. 3, 1986, pp. 42–43.

Thompson, R. I. and Schwennesen, K., "Refrigerating Machinery Oils for Retooling Refrigerators and Air–Conditioning Systems to Fluorocarbon 134a. Shifting from R12 to R134a Ensures At Least Equivalent Performance," Die Kälte Und Klimatechnik, May 1992, pp. 286–289. In German. (English abstract also enclosed).

Yokoo, S., Koichi D., Takano, T. and Kaimai, T., "Development of a Lubricant for Retrofitting Automotive Air Conditioners for Use with HFC–134a, " SAE Technical Paper Series 940594 (1994). (no month available).

Ax, H., Jingu, N. and Komatu, S., "The Development of a Retrofitting Procedure for CFC–12 Automotive A/C Systems to HFC–134a and P.A.G. Lubricant," SAE Technical Paper Series 932906 (1993). (month unavailable).

Smith, A. M., Beggs, M. C. and Greig, B. D., "Experience of Retrofitting Automotive Air–Conditioning from CFC12 to HFC 134a," SAE Technical Paper Series 930292 (1993). (month unavailable).

Corr, S., Dekleva, T. W. and Savage, A. L., "Retrofitting Large Refrigeration Systems With R–134a," ASHRAE Journal, Feb. 1993. (month unavailable).

NERAC Search Results. (Date unknown).

*Primary Examiner*—Prince Willis, Jr.

*Assistant Examiner*—James M. Silbermann

*Attorney, Agent, or Firm*—Davis Hoxie Faithfull & Hapgood

[57] ABSTRACT

Certain organic diesters and triesters have been found to be useful as flushing oils in retrofitting CFC-based cooling systems to HFC-based cooling systems. These include compositions of the formulae $R_1OOC—Q—COOR_2$

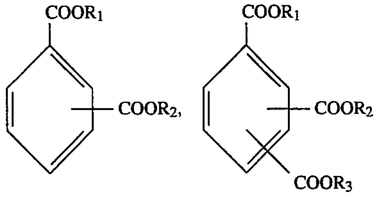

and mixtures thereof, wherein Q is a straight- or branched-chain hydrocarbon group having from 2 to 10 carbon atoms and $R_1$, $R_2$ and $R_3$ can be the same or different and are straight- or branched-chain hydrocarbon groups containing from 6 to 13 carbon atoms. In use as a flushing oil, the lubricating oil is drained, the flushing oil is added and the system is run for about 24 hours. This oil is then drained and fresh flushing oil is added. The process is repeated until the original lubricating oil is within a desired range of the total flushing oil, say up to about 5% wt.

13 Claims, No Drawings

METHOD FOR FLUSHING A REFRIGERATION SYSTEM

FIELD OF THE INVENTION

This invention relates to a synthetic oil comprising organic diester- or organic triester-based fluids, or mixtures thereof, useful as a flushing oil for retrofitting CFC/mineral oil refrigeration systems to non-chlorinated HFC/synthetic oil refrigeration systems.

BACKGROUND OF THE INVENTION

Traditionally, chlorofluorocarbon (CFC) and hydrochlorofluorocarbon (HCFC) type refrigerants, such as CFC-11 (trichloromonofluoromethane), CFC-12 (dichlorodifluoromethane) and HCFC-22 (monochlorodifluoromethane) among others, have been used as refrigerants in refrigerators, air conditioners, chillers, commercial buildings and other appliances. These chlorine-based refrigerants are believed to destroy the ozone layer and therefore their use is to be gradually eliminated by 1996, under a recent protocol signed in Montreal, Canada by representatives of 167 countries of the world.

Chlorine-free hydrogen-containing halocarbons have already been introduced to replace CFC- and HCFC-type refrigerants. Hydrofluorocarbons (HFC), such as HFC-134 (1,1,2,2-tetrafluoroethane) and HFC-134a (1,1,1,2-tetrafluoroethane), are considered to be direct replacements for CFC-12 (also known as R-12) refrigerant. The cooling (thermodynamic) properties of HFC-134a are similar to those of the R-12 product in many applications and HFC-134a appears to have emerged as the currently preferred HFC refrigerant.

Historically, mineral oils, particularly naphthenic mineral oils, and alkylbenzenes, have been used as lubricants with the CFC-type refrigerants. However, the mineral oils have exhibited poor miscibility with HFC-type refrigerants: the resulting HFC/mineral oil mixture has been found to separate into two layers at ambient temperature. This results in the oil clogging in the cold temperature (evaporators) areas, thus restricting the refrigerant flow and causing poor oil return to the compressor, and it results in reduced efficiency. The lack of an effective lubricant to the compressor can also cause bearing seizure, and eventually compressor breakdown will occur.

Synthetic oils, such as polyalkylene glycol- and polyol ester-type refrigeration oils, have heretofore been introduced as lubricants for HFC-based systems. They have excellent miscibility with HFC-134a. See, for example, U.S. Pat. Nos. 4,948,525 and 4,755,316, which are hereby incorporated herein by reference in their entirety. These synthetic oils perform well in lubricating the compressor bearings.

However, in order to convert a CFC-based system to an HFC-based system, it is necessary to replace the mineral oil used as the lubricant in the CFC-based system with an HFC-134a-compatible lubricant such as those mentioned previously. To remove the mineral oil from the system, several flushes (say, a minimum of two to four) are required with the synthetic oils before a reasonably low and acceptable level (say, less than about 5%) of mineral oil can be achieved. For large systems, even more than four flushes can be required to reduce the mineral oil content to acceptable levels. This retrofitting procedure is thus quite expensive to carry out, since the useful synthetic oils, such as polyol esters, are relatively costly. After the synthetic oils have replaced the mineral oil in the system, the CFC is then removed and replaced with the HFC.

Until the present invention, the only lubricants reported to have been used in flushing mineral oils from CFC/mineral oil systems were polyglycols, hindered polyol esters, branched polyol esters or mixtures thereof. These prior lubricants are not only expensive but do not possess the inherent lubricity and higher solvating properties required to thoroughly cleanse the refrigeration system of mineral oil and chlorinated hydrocarbons. In addition, because of the hygroscopic nature of polyglycol and polyol esters, they disadvantageously tend to pick up water during a retrofitting operation which requires more than about three flushes to remove an adequate amount of the mineral oil from the system. It was also found that in the presence of chlorinated refrigerants, the prior art compositions hydrolyze even more, forming acids which can cause corrosion problems in compressors. To overcome these problems, additives (such as phenolic or amine antioxidants) are sometimes used, but the additives may not be compatible with the refrigerants. As a result, the additives can form a precipitate and cause circuit clogging and inefficient cooling.

Chlorinated solvents have also been used previously to flush mineral oils from compressors when the compressors have been retrofitted from CFC-12 to HFC-134a. Such chlorinated solvents have included CFC-11 and CFC-113 (1,1,2-trichloro- 1,2,2-trifluoroethane). However, these are solvents, not lubricants, are toxic and are not chlorine-free.

Other prior art systems used to flush mineral oils from compressors have included mixtures of terpene hydrocarbon solvents and terpene alcohol compositions. See, for example, U.S. Pat. No. 5,174,906, which is hereby incorporated herein by reference in its entirety. These systems are very expensive to use and are not useful as lubricants.

Polyol ester-based compositions which have been used to flush mineral oils from CFC-based systems are commercially available from a number of manufacturers. See, for example, U.S. Pat. No. 5,021,179, which is hereby incorporated herein by reference in its entirety.

None of these methods of flushing mineral oils from a CFC-based refrigeration system has been found to be entirely satisfactory and relatively inexpensive.

SUMMARY OF THE INVENTION

It has now been found that certain organic diesters and organic triesters have excellent miscibility (at low concentrations) with chlorine-free hydrofluorocarbons (such as, for example, HFC-134a), as well as excellent miscibility at every ratio of ingredients with chlorine-containing conventional refrigerants (CFC), such as R-12. Furthermore, these diesters and triesters are also soluble in mineral oil in every proportion. They are also miscible with polyol esters, alkylbenzenes and polyalkylene glycols, have excellent heat resistance properties, high electrical insulating properties, good lubricity, excellent solvating properties, and low pour points. Furthermore, they are relatively inexpensive to use as flushing oils as compared to the prior art synthetic oils and methods.

A series of miscibility tests was carried out using 0 to 90% by weight of the diesters or triesters with polyol ester refrigeration oils (the Anderol® RCF-E-Series, available commercially from Hüls America, Inc.). It was found that the inclusion of the diesters or triesters in various proportions did not adversely affect the miscibility with polyol ester refrigeration oil. Furthermore, the lubricity of the polyol ester was enhanced to a measurable value, the hygroscopicity was lowered and the hydrolytic stability was improved by addition of these di- or tri-esters.

A number of compressor units containing mineral oil and R-12 refrigerants were flushed with diester- or triester-based flushing oil before a polyol ester refrigeration lubricant was charged to these compressors. It was found generally that two to three flushes with diester-based flushing oils were required to achieve acceptable residual mineral oil levels of about 5% or lower. The units were then tested for rapid cycle endurance tests with polyol ester-based working fluids. The compressor parts, especially the wrist pin and the connecting rod, exhibited negligible wear. Before starting the compressor for endurance testing, an oil analysis was carried out. It was found that 5–10% diesters remained in the compressor. Falex testing (a wear performance evaluation test, described in ASTM D 3233-93) of this oil indicated improved wear performance as compared to the neat polyol ester.

DETAILED DESCRIPTION OF THE INVENTION

It has now been found that some organic diesters and triesters are miscible at proportions up to 30% with the polyol esters and with the HFC-type refrigerants, such as R-134 or R- 134a. Compositions of 0–30% wt. diester or triester and 70–100% wt. polyol esters have been found to be miscible with HFC refrigerants over the temperature range of –40° C. to +80° C. This property is considered by those of ordinary skill in the art to be perhaps the primary requirement for identification of useful refrigeration lubricants. Organic esters made from the reaction of certain straight- or branched-chain dicarboxylic acids and certain straight- or branched-chain alcohols are useful.

Useful diesters and triesters of the invention can have the general formulae: $R_1OOC—Q—COOR_2$

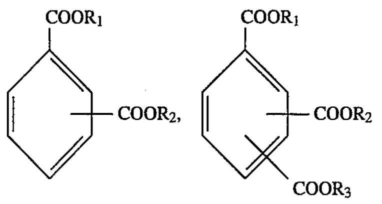

where Q is a straight- or branched-chain alkyl group having from 2 to 10 carbon atoms and $R_1$, $R_2$ and $R_3$ can be selected independently from straight- or branched-chain hexyl, heptyl, octyl, nonyl, decyl, undecyl, dodecyl and tridecyl groups. Preferably, Q is a butyl ($C_4$) group and $R_1$, $R_2$ and $R_3$ are branched-chain octyl ($C_8$) groups. Mixtures of the useful diesters and triesters can also be used.

Diesters and triesters useful in the present invention can be produced by procedures well known to those of ordinary skill in the ester-synthesis art. For example, useful diesters can be prepared by direct esterification of dicarboxylic acids such as phthalic acids or adipic acids with an equivalent amount of alcohol in the presence of a catalyst such as sulfuric acid. Furthermore, prepared di- or tri-esters can be blended together to obtain desired properties, for example, viscosity. These di- and tri-esters have been successfully used since about 1941 in many other applications, and are especially useful in air-compressor applications where low quantities of degradation products together with adequate amounts of lubricity are highly desirable. These compositions have a long history of excellent performance in reciprocating vane and rotary type applications. In these prior applications, the compressor lubricants come into contact with the gases that are being compressed or cracked, e.g., hydrogen, methane, ethane and ethylene, without deleterious effect. These latter groups are in the backbone of some new refrigerants, such as R-134a.

Useful esters for the present invention include for example, without limitation: dioctyl adipate (DOA); diisooctyl adipate (DIOA); diisodecyl adipate (DIDA); ditridecyl adipate (DTDA); dioctyl azelate (DOZ); dioctyl phthalate (DOP); diisooctyl phthalate (DIOP); diisodecyl phthalate (DIDP); ditridecyl phthalate (DTDP); dioctyl sebacate (DOS); triisodecyl trimellitate (TIDTM); triisooctyl trimellitate (TIOTM); trioctyl trimellitate (TOTM), and mixtures thereof. Preferred are diisooctyl adipate (DIOA), ditridecyl adipate (DTDA), trioctyl trimellitate (TOTM), and mixtures thereof. Other organic diesters and triesters can also be used.

In accordance with this invention the diesters and triesters, e.g., ditridecyl adipate, ditridecyl phthalate and trioctyl trimellitate, are used without additives as flushing fluids or flushing oils. If desired, a small amount (0.1 to 0.3% wt.) of an antioxidant, for example, 2,6-di-tertiary-butyl-4-methyl phenol, can be added to the flushing fluids to enhance oxidative resistance. Several experiments were carried out using certain diesters and triesters of the invention as flushing oils in a retrofitting operation. It was found that these lubricants are oxidatively stable and retain viscosity and lubricating properties under extreme conditions. They are good lubricants for the crank shaft, drive train and transmission portions of compressors. Because they are miscible with HFC-type refrigerants at low concentrations, the residual flushing fluid remaining in the system after flushing (5 to 10% wt.) is readily incorporated into the working fluids which are polyol ester-based. In fact it was found that up to 10% diesters or triesters have a beneficial effect on the polyol ester-based working fluids since they enhance the wear and extreme pressure performance properties of the working fluids. Table A below illustrates the beneficial effect. In each case, the lubricant composition which contained the 10% DIDA exhibited better Falex and four ball wear test data as compared to the neat polyol ester lubricant.

TABLE A

POLYOL ESTER BASED REFRIGERATION LUBRICANTS WITH AND WITHOUT DIDA

| Tests Performed | Anderol ® RCF-E-32 (Fluid A) | Fluid A + 10% DIDA | Anderol ® RCF-E-46 (Fluid B) | Fluid B + 10% DIDA |
|---|---|---|---|---|
| Falex lbs. to fail | 1000 lbs. | 2250 lbs. | 1000 lbs. | 2250 lbs. |
| 4-ball wear test | 0.89 mm. | 0.70 mm. | 0.95 mm. | 0.70 mm. |

TABLE A-continued

| POLYOL ESTER BASED REFRIGERATION LUBRICANTS WITH AND WITHOUT DIDA | | | | |
|---|---|---|---|---|
| Tests Performed | Anderol® RCF-E-32 (Fluid A) | Fluid A + 10% DIDA | Anderol® RCF-E-46 (Fluid B) | Fluid B + 10% DIDA |
| 1200 RPM, 75° C./1 hr. (ASTM D 2266-93) | | | | |

The invention is further illustrated, and not limited, by the following examples:

EXAMPLE I

A composition comprising diisooctyl adipate (99.95% wt.) and a copper deactivator (benzotriazole, 0.05% wt.) was prepared. This composition had a pour point of −60° C., a viscosity of 7.9 cSt at 40° C. and a viscosity index of 142.

The composition was used as a flushing oil to flush the lubricant from a ¼ hp refrigeration compressor, which had been utilizing a naphthenic mineral oil and CFC-R-12 refrigerant prior to the retrofitting operation. To retrofit the compressor, the mineral oil was first drained from the bottom and then the compressor was charged with an equivalent amount of flushing oil (approximately 300 ml). The compressor was then run for 24 hrs. After 24 hrs., the flushing oil was drained and the amount of mineral oil content in the flushing oil was checked. It was found that the compressor still had approximately 15% wt. mineral oil. The above-described operation was repeated two more times and brought the mineral oil level down to less than 5.0% wt. after the second repetition. The compressor was then charged with a polyol ester-based refrigeration lubricant (available commercially as Anderol® RCF-E-32) and was tested by a rapid cycle endurance test (10 seconds on followed by 10 seconds off) for 250,000 cycles. After completion of the rapid cycle test, the compressor was opened for examination of wear and corrosion.

The procedure described above was performed side-by-side with a second ¼ hp compressor which was retrofitted by using a polyol ester lubricant as a flushing oil.

Comparative wear and corrosion studies of the two compressors showed improved performance, and lower wear on the wrist pin and connecting rod, on the compressor that was retrofitted with the flushing oil containing diesters over the compressor which was retrofitted by using the polyol ester lubricant as a flushing oil.

EXAMPLE II

A composition was prepared which contained 50% wt. diisoctyl adipate and 50% wt. ditridecyl adipate. A copper deactivator (benzotriazole) was added at a 0.050% wt. level based on the weight of base ester. The composition had a pour point of −60° C., a viscosity of 15.0 cSt at 40° C. and a viscosity index of 143. This fluid was used to flush mineral oil from a compressor using the method described in Example I. At the conclusion of the flushing operation, the compressor was charged with a polyol ester-based refrigeration oil and a 250,000 rapid cycle compressor endurance test was performed. This experimental flushing oil successfully flushed mineral oil from the system and the flushing oil left over from the flushing operation was completely soluble and miscible with the polyol ester-based refrigeration oil and HFC-134a.

EXAMPLE III

A composition was prepared based on 65% wt. trioctyl trimellitate and 35% wt. of diisooctyl adipate. A copper deactivator (benzotriazole) was added at a 0.05% wt. level based on the weight of base ester. This composition had a pour point of −50° C., viscosity of 31 cSt at 40° C. and a viscosity index of 116 and was used as a flushing oil to flush mineral oil from a compressor in the manner described in Example I. At the conclusion of the flushing operation, the compressor was charged with a polyol ester-based working refrigeration oil and a rapid cycle compressor endurance test was performed. At the conclusion of 250,000 cycles, the compressor was opened and connecting rod and wrist pin wear was examined. It was found that the connecting rod and wrist pin had negligible wear and there was no corrosion on these parts.

EXAMPLE IV

Based on the results described above, it is expected that useful flushing fluids of various viscosities can be prepared using combinations of diesters and triesters. For example, a ditridecyl diester can be combined with a trioctyl trimellitate to obtain a flushing fluid having a viscosity of between 46 cSt and 68 cSt at 40° C. The pour points of these combination blends are below −50° C. Blends of these esters will have higher flash and fire points. A copper deactivator, benzotriazole, can also be added to the fluids, which will be useful as flushing fluids.

It has also been found that the diesters and triesters described above as useful flushing oils in accordance with the invention can be used in proportions up to about 40% wt. in combination with commercially available polyol esters. The combinations are useful both as flushing oil compositions and as working lubricant compositions. Example V is illustrative.

EXAMPLE V

A composition was prepared which contained 40% wt. of diisooctyl adipate and 60% wt. of a polyol ester (100 cSt at 40° C.). The polyol ester used was the commercially available product Anderol® RCF-E-100 which is based on pentaerythritol and $C_5$–$C_{10}$ acids. Benzotriazole at 0.05% wt. was added to this composition. This composition had a pour point of −60° C., a viscosity of 31 cSt at 40° C. and a viscosity index of 132. The composition was used as a flushing oil to flush mineral oil from a refrigeration compressor that contained mineral oil and R-12 refrigerant. After completion of the flushing operation, the compressor was charged with additional Example V composition as a lubricant. This compressor has completed a 250,000 rapid cycle endurance test. The connecting rod and wrist pin had negligible wear and no corrosion was observed on these compressor parts.

What is claimed is:

1. A method for removing unwanted lubricating oil from a refrigeration system comprising the steps of:

(a) adding a charge of a flushing oil to a previously partially drained lubricating oil receptacle of a refrigeration system, (b) running the system for a period of time which is sufficient to allow the performance of several cooling cycles, (c) draining the charge of the flushing oil, and (d) repeating steps (a)–(c) until the residual amount of unwanted lubricating oil is less than a specified proportion by weight of the flushing oil, wherein the flushing oil comprises a composition selected from the group consisting of $R_1OOC—Q—COOR_2$,

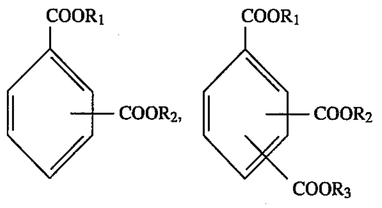

and mixtures thereof, wherein Q is a straight- or branched-chain hydrocarbon group having from 2 to 10 carbon atoms and $R_1$, $R_2$ and $R_3$ can be the same or different and are straight- or branched-chain hydrocarbon groups containing from 6 to 13 carbon atoms.

2. The method of claim 1 wherein the flushing oil comprises one or more of dioctyl adipate, diisooctyl adipate, diisodecyl adipate, ditridecyl adipate, dioctyl azelate, dioctyl phthalate, diisooctyl phthalate, diisodecyl phthalate, ditridecyl phthalate, dioctyl sebacate, triisodecyl trimellitate, triisooctyl trimellitate and trioctyl trimellitate.

3. The method of claim 1 wherein the residual amount of unwanted lubricating oil is less than about 5% wt. of the flushing oil.

4. The method of claim 1 wherein the period of time which is sufficient to allow the performance of several cooling cycles is about 24 hours.

5. The method of claim 1 wherein the unwanted lubricating oil is a mineral oil.

6. The method of claim 1 wherein the refrigeration system comprises chlorofluorocarbons.

7. A method for removing unwanted lubricating oil from a CFC-based cooling system comprising the steps of:

(a) draining a lubricating oil receptacle of the system and leaving a residual amount of the unwanted lubricating oil therein, (b) adding a charge of a flushing oil to refill the lubricating oil receptacle, (c) running the system for several cooling cycles, and (d) repeating steps (a)–(c) until the residual unwanted lubricating oil comprises less than a specified proportion of the most recent charge of flushing oil, wherein the flushing oil comprises a composition selected from the group consisting of $R_1OOC—Q—COOR_2$

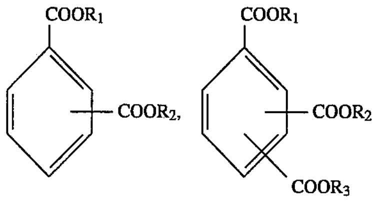

and mixtures thereof, wherein Q is a straight- or branched-chain hydrocarbon group having from 2 to 10 carbon atoms and $R_1$, $R_2$ and $R_3$ can be the same or different and are straight- or branched-chain hydrocarbon groups containing from 6 to 13 carbon atoms.

8. The method of claim 7 wherein the flushing oil comprises one or more of dioctyl adipate, diisooctyl adipate, diisodecyl adipate, ditridecyl adipate, dioctyl azelate, dioctyl phthalate, diisooctyl phthalate, diisodecyl phthalate, ditridecyl phthalate, dioctyl sebacate, triisodecyl trimellitate, triisooctyl trimellitate and trioctyl trimellitate.

9. The method of claim 8 wherein the residual unwanted lubricating oil is less than about 5% wt. of the flushing oil.

10. The method of claim 9 wherein the several cooling cycles are run during a period of about 24 hours.

11. The method of claim 8 wherein the unwanted lubricating oil is a mineral oil.

12. The method of claim 2 wherein the flushing oil comprises one or more of diisooctyl adipate, ditridecyl adipate and trioctyl trimellitate.

13. The method of claim 8 wherein the flushing oil comprises one or more of diisooctyl adipate, ditridecyl adipate and trioctyl trimellitate.

* * * * *